Feb. 22, 1966    J. CARNESECCA, JR., ETAL    3,236,156
VARIABLE FLUID POWER OPERATED PRUNING SHEARS
Filed June 19, 1962    4 Sheets-Sheet 1
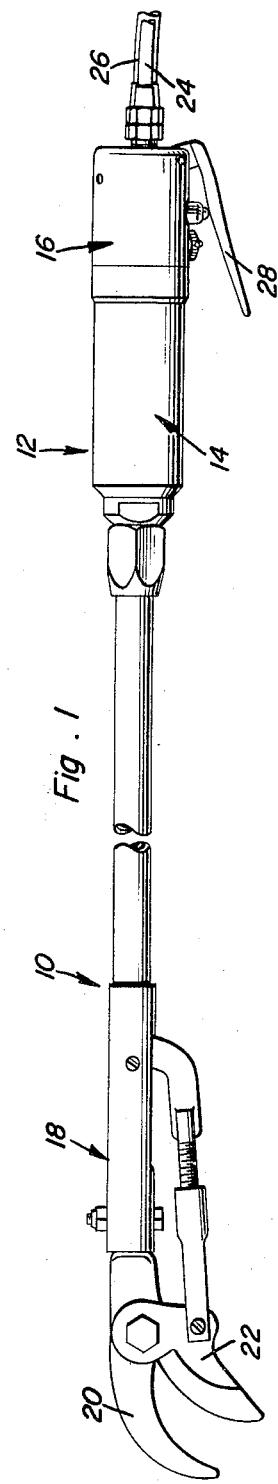
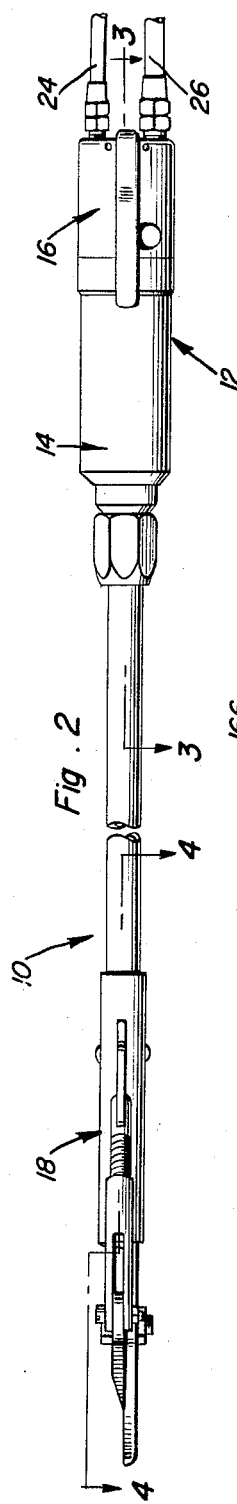
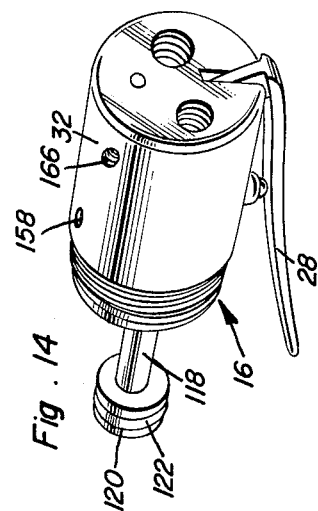
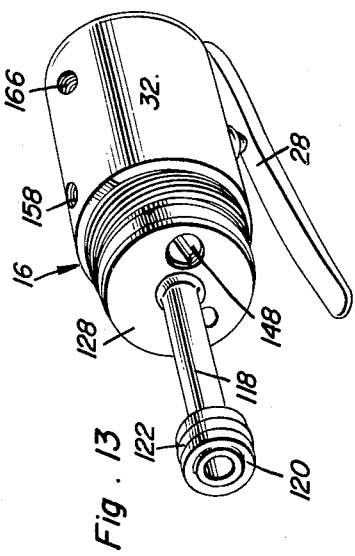
Joseph Carnesecca, Jr.
Egidio C. Carnesecca
INVENTORS

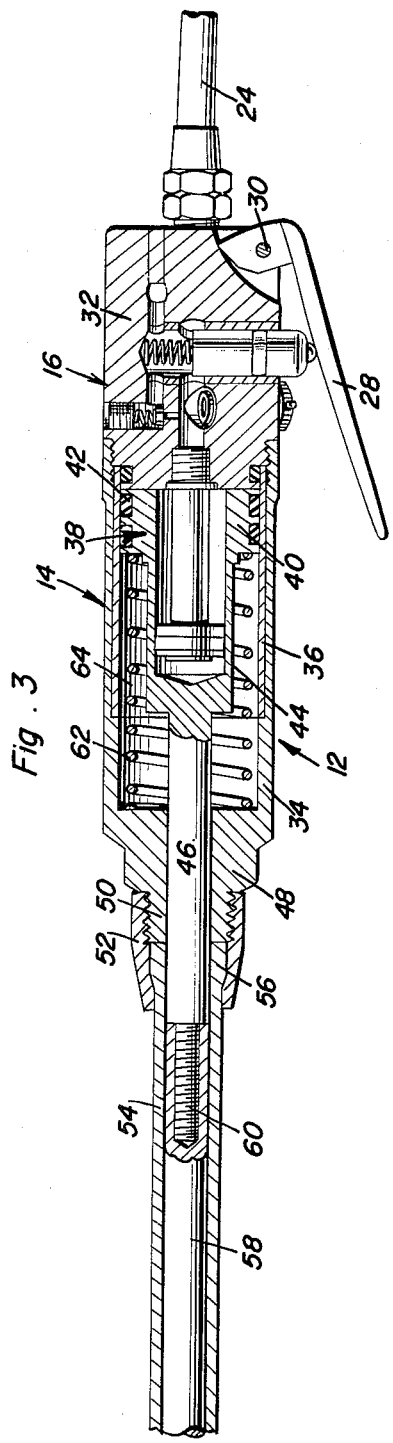

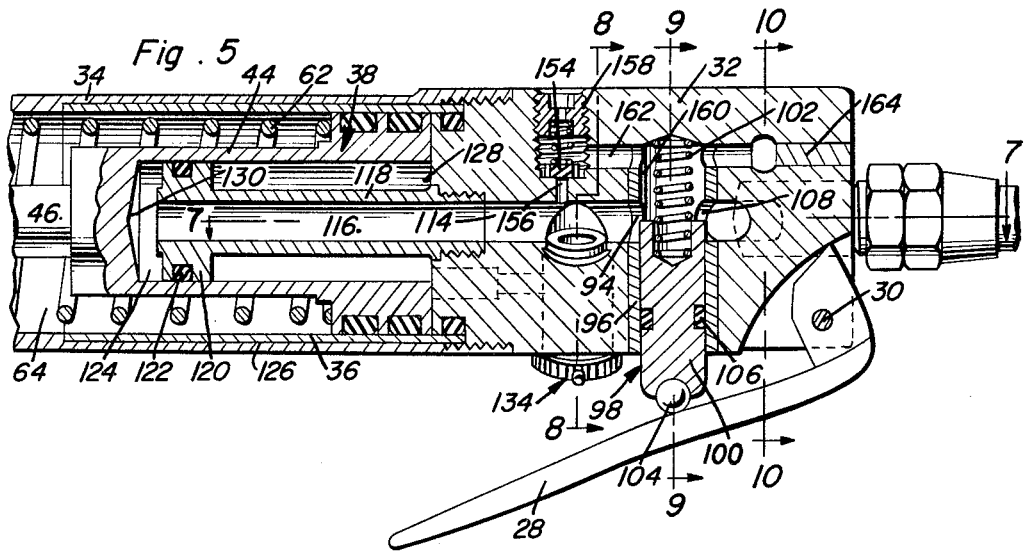
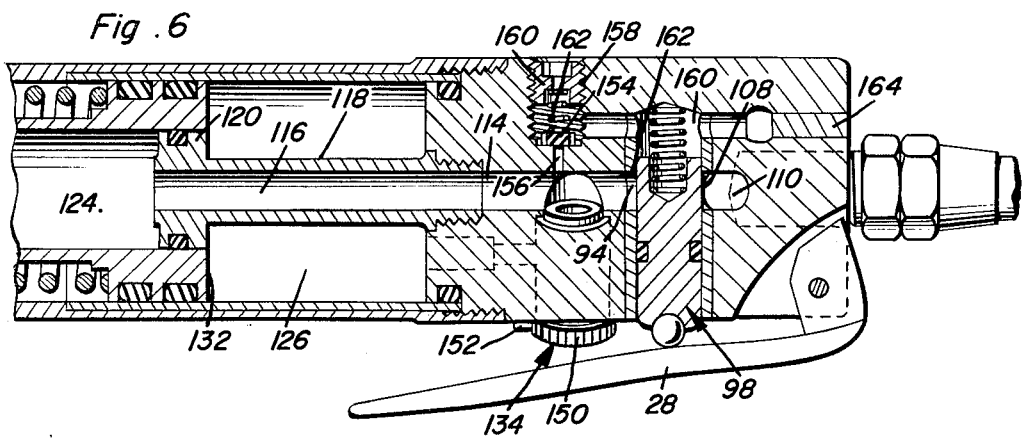
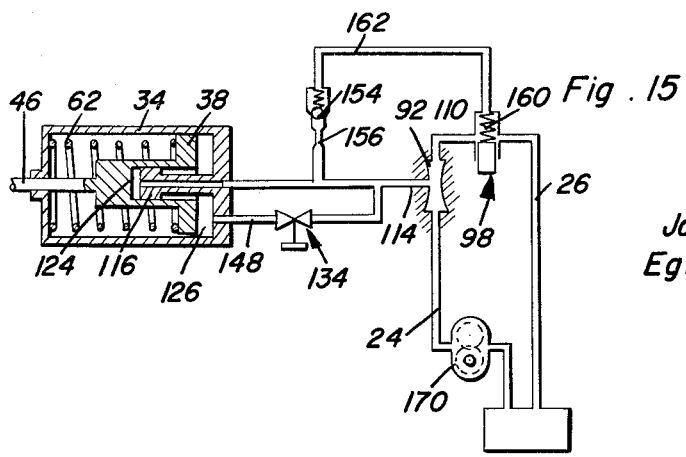
Joseph Carnesecca, Jr.
Egidio C. Carnesecca
INVENTORS

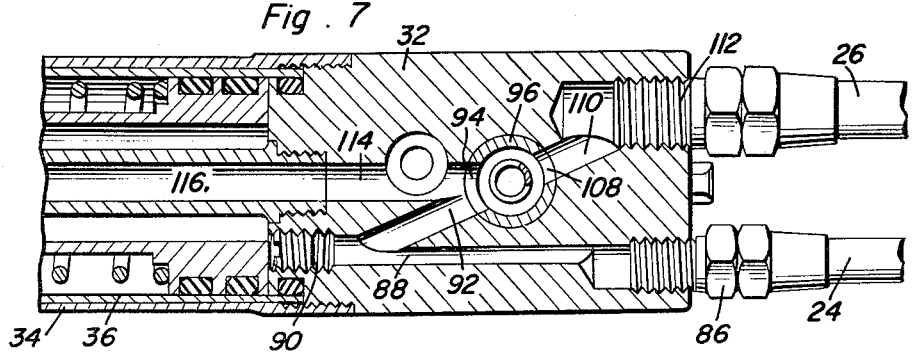
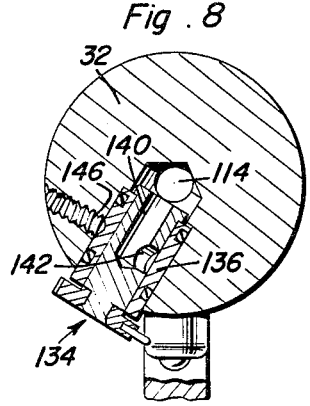
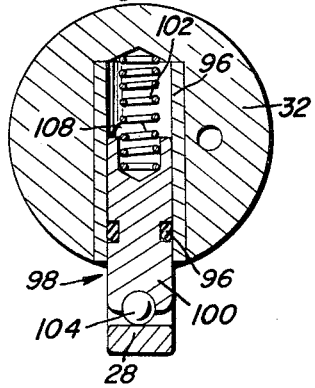
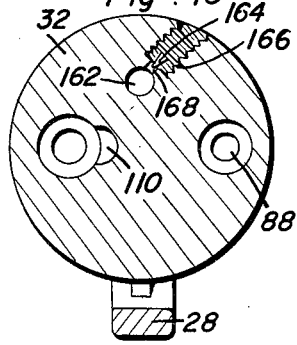
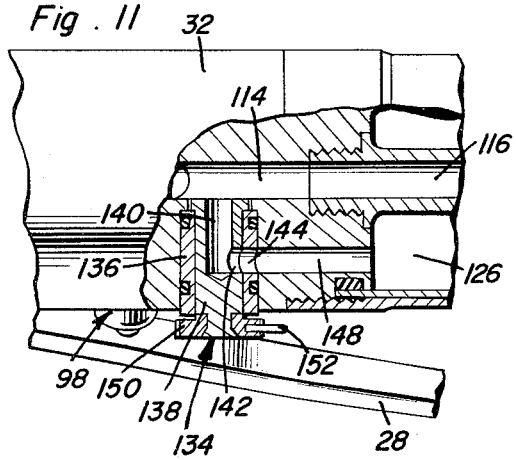
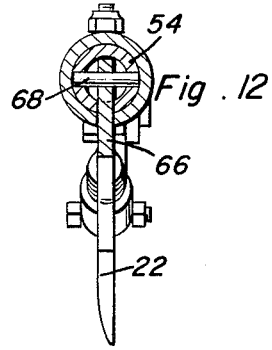
Joseph Carnesecca, Jr.
Egidio C. Carnesecca
INVENTORS United States Patent Office 3,236,156
Patented Feb. 22, 1966

1

3,236,156
VARIABLE FLUID POWER OPERATED
PRUNING SHEARS
Joseph Carnesecca, Jr., and Egidio C. Carnesecca, both of
R.F.D. Box 304, Springville, Utah
Filed June 19, 1962, Ser. No. 203,604
13 Claims. (Cl. 91—50)

This invention relates to fluid power operated mechanism for power cutting tools in general and in particular to a variable fluid power operated pruning shear device.

The fluid power operated apparatus of the present invention is particularly useful in connection with the operation of pruning shears in that it may be conditioned for different power requirements so as to render a single pruning shear device operative in connection with both the rapid cutting of plant stems of reduced diameter or twigs in one type of pruning operation and also in connection with low speed heavy-duty operation when pruning plants with heavier limbs or branches. It is therefore a primary object of the present invention to provide a fluid power operated mechanism for pruning shears capable of being utilized under two different speeds and force transmitting conditions.

Another object of the present invention is to provide a fluid power operated mechanism for pruning shears or the like associated with a normally unloaded fluid pumping system, the power operated mechanism being operative to only intermittently load the pump mechanism or only when cutting.

A further object of the present invention is to provide a power operated mechanism for pruning shears controlled by the trigger actuated valve which temporarily loads a normally unloaded circulating fluid system with which the power operated mechanism is associated.

An additional object of the present invention is to provide a power operated mechanism for pruning shears featuring a selective control device operative to vary the displacement rate and force supplied to the shearing blade by means of a piston device having a plurality of areas selectively exposed to fluid under pressure in accordance with the power requirements.

A still further object of the present invention in accordance with the foregoing objects, is to provide a power operated mechanism featuring a relief valve through which a restricted flow of fluid is operative to restore a normally free circulating fluid system to its unloaded condition when a predetermined maximum load is applied to the piston rod of the power operated device.

Another object of the present invention is to provide a fluid power operated mechanism for pruning shears associated with an intermittently loaded free circulating hydraulic system operative when being restored to an unloaded condition, to produce a suction pressure within the power operated device so as to assist rapid return of the piston device to its initial position.

In accordance with the foregoing objects, the power operated mechanism of the present invention has significant advantages in that the pruning shears with which it is associated, may be utilized more advantageously and in connection with a wider range of pruning load requirements, together with a more efficient utilization of the source of power. Accordingly, the power operated mechanism does not involve any volumetric flow variation in the inlet conduit or return conduit connected to the power operated device, the power operated device being controlled by a trigger valve operative to either open or close the fluid circuit which extends through the valve body of the power operated device. Also, variations in the force and displacement rate of the shear blade is obtained without any variation in the stroke length of the shear blade or piston connected thereto. In addition to the foregoing,

2 the fluid circulating system with which the power operated device is associated, does not involve any pressure regulating or pressure varying control valve for varying the operating conditions of the power operated device as hereinbefore indicated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a typical power operated pruning shear constructed in accordance with the principles of the present invention.

FIGURE 2 is a bottom plan view of the pruning shear illustrated in FIGURE 1.

FIGURE 3 is a partial longitudinal sectional view taken substantially through a plane indicated by section line 3—3 of FIGURE 2.

FIGURE 4 is a partial longitudinal sectional view taken substantially through a plane indicated by section line 4—4 in FIGURE 2.

FIGURE 5 is an enlarged partial sectional view of the cylinder and valve body portion of the pruning shear device constituting the power operated mechanism thereof.

FIGURE 6 is an enlarged partial sectional view similar to FIGURE 5 but illustrating the power operated mechanism in a load engaging condition.

FIGURE 7 is a sectional view taken substantially through a plane indicated by section line 7—7 in FIGURE 5.

FIGURE 8 is a transverse sectional view taken substantially through a plane indicated by section line 8—8 in FIGURE 5.

FIGURE 9 is a transverse sectional view taken substantially through a plane indicated by section line 9—9 in FIGURE 5.

FIGURE 10 is a transverse sectional view taken substantially through a plane indicated by section line 10—10 in FIGURE 5.

FIGURE 11 is an enlarged partial side elevational view of the power operated mechanism portion of the pruning shear with parts broken away and shown in section.

FIGURE 12 is a transverse sectional view taken substantially through a plane indicated by section line 12—12 in FIGURE 4.

FIGURE 13 is a prespective view of the control valve assembly portion of the power operated mechanism for operating the pruning shear as viewed from one end.

FIGURE 14 is a perspective view of the control valve assembly as viewed from another end.

FIGURE 15 is a fluid circuit diagram illustrating the fluid circulating system with which the device of the present invention is associated, and the manner in which the device is operative in connection with the fluid circulating system.

Referring now to the drawings in detail, it will be observed from FIGURES 1 and 2 that the power operated pruning shear of the present invention is generally referred to by reference numeral 10 and includes a fluid power operated mechanism assembly generally referred to by reference numeral 12 which consists of a force developing portion 14 and a control portion 16. Connected to the power operated mechanism 12, and projecting forwardly therefrom, is a cutter actuating assembly generally referred to by reference numeral 18 to which the fixed pruning blade member 20 and the pivoted knife blade member 22 are operatively connected. Connected to the power operated mechanism 12 and extending rearwardly therefrom, is a pressure inlet hose 24 and a pressure return hose 26, the inlet hose and return hose being connected to a free fluid circulating pumping system by means of which fluid is normally freely circulated between the inlet hose 24 and the return hose 26 through the control valve assembly 16 of the power operated mechanism 12 at a relatively low static pressure.

Referring now to FIGURES 3 and 4 in particular, it will be observed that the power operated mechanism 12 includes an actuating trigger member 28 pivotally mounted adjacent the rear end of the control valve assembly portion 16 by means of the pin 30, the trigger actuator 28 being disposed below the valve body 32 and projecting forwardly so that it may be readily grasped by the fingers of the operator's hand in order to initiate the cutting operation by the pruning blades 20 and 22. Threadedly mounted on the valve body 32 and projecting forwardly therefrom, is the cylinder member 34 of the portion 14 of the power operated mechanism. A tubular sleeve 36 is mounted within the cylinder member 34 for slidably mounting therewithin a multi-surface piston generally referred to by reference numeral 38. The piston 38 includes a large diameter portion 40 at a rear end thereof having piston rings 42 in sealing relation to the internal surface of the sleeve 36. The piston 38 also includes a reduced diameter portion 44 connected to a piston rod 46 which slidably extends through an end wall portion 48 of the cylinder member having an externally threaded portion 50 adapted to threadedly receive a nut member 52. The nut member is operative to axially fix a hollow tubular extension shaft 54 to the cylinder member by means of an enlarged collar portion 56 formed at the rear end of the extension shaft which permits rotation of the extension 54 about its longitudinal axis as hereafter indicated. The rear end portion of the extension shaft therefore slidably receives the piston rod 46 which is connected to an actuating rod 58 slidably received within the hollow extension shaft 54 connected to the piston rod by the threaded connection 60. When the piston 38 is axially displaced in a forward direction against the bias of the return spring 62 located within the cylinder chamber 64, the actuating rod 58 will be slidably displaced within the hollow tubular extension shaft 54 so as to displace an adjustable linkage member 66 pivotally connected by the pin 68 to the forward end of the actuating rod 58. The adjustable linkage member 66 includes a threaded portion 70 adjustably connected to an internally threaded portion 72 of the link member 74 which is connected by the pin 76 to the pivoted knife blade element 22. The knife blade 22 is therefore pivotally mounted on the fixed blade 20 secured by the bolt assembly 78 to the forward end of the extension shaft 54. Also, secured about the forward end of the extension shaft 54 by the bolt assembly 78, is a sleeve 80 which extends rearwardly therefrom beyond the pivotal connection of the actuating rod to the adjustable link member 66, the sleeve 80 being provided with a slot 82 aligned with a slot 84 within the tubular extension shaft 54 through which the adjustable linkage member 66 extends. Thus, it will be apparent the the piston member 38 within the power operated mechanism 12 will be operative to reciprocate the actuating rod 58 within the tubular extension 54 in order to perform a cutting action by pivotal displacement of blade 22. The actuating assembly 18 is also rotatable about its longitudinal axis with the tubular shaft 54 so that pruning may be performed at any angle without necessity for angularly displacing the mechanism 12 being held in the operator's hand.

Referring now to FIGURES 5 and 7, it will be observed that the pressure inlet hose 24 is connected by the fitting 86 to an inlet passage 88 within the valve body 32 of the control valve assembly 16. The forward end of the inlet passage 88 is closed by the screw element 90 adjacent to which a connecting inlet passage 92 intersects the inlet passage 88 providing fluid communication to the inlet port 94 formed in the cylindrical sleeve 96 of a fluid circuit interrupting valve device generally referred to by reference numeral 98. The valve device 98 therefore includes a reciprocable valve element 100 spring biased by the spring element 102 to a downward position as illustrated in FIGURE 5 holding the trigger actuator 28 in an extended position, the trigger actuator abutting against the bearing element 104 mounted at the lower end of the valve element 100. The valve element is provided with an annular recess receiving a sealing ring 106 disposed in sealing relation to the fixed cylindrical sleeve 96 within which the inlet port 94 is disposed. It will therefore be apparent, that the valve element 100 under the bias of the spring element 102 normally provides open fluid communication between the inlet port 94 and an outlet port 108 which is connected to an outlet passage 110 formed in the valve body 32 for returning fluid to the return hose 26 connected to the return passage 110 by means of fitting 112. It will be observed from FIGURE 7 that the flow passages 88, 92 and 110 form a flow restriction between the conduits 24 and 26 so as to produce a venturi action when fluid flow between conduits 24 and 26 is unblocked and corresponds to the diagrammatic illustration in FIGURE 15. It will therefore be apparent, that when the mechanism is grasped in the hands of the operator, and the trigger actuator 28 depressed, the valve element 100 will be displaced upwardly against the bias of the spring 102 so as to block fluid communication between the inlet and outlet ports 94 and 108 as illustrated in FIGURE 6 in order to interrupt the circulating flow of fluid in the free circulating circuit to which the mechanism 12 is connected by the conduits 24 and 26 and thereby load the pump 170 so as to develop a relatively high static pressure in its discharge conduit 24.

The inlet port of the circuit interrupting valve device 98, is connected by the supply passage 114 in the valve body 32, to an extended passage 116 formed within a tubular member 118 fixed to the valve body 32 by the threaded connection and projecting forwardly therefrom as more clearly seen in FIGURES 13 and 14. Connected to the forward end of the tubular member 116, is an enlarged diameter portion 120 seating an annular sealing ring 122 disposed in sealing relation to the internal walls of the hollow piston 38. Accordingly, the enlarged diameter portion 120 of the tubular member 118 fixed to the valve body 32, forms on one side thereof an inner pressure chamber 124 in communication with the supply passage 114 through the passage 116 while on the other side thereof, a second pressure chamber 126 is formed between the piston 38 and the end wall 128 of the valve body 32. It will therefore be apparent, that the piston assembly 38 will be provided with a force transmitting surface 130 at its forward end forming the forward end of the pressure chamber 124 and with an annular force transmitting surface 132 with respect to the second pressure chamber 126 as more clearly seen in FIGURE 6. Ordinarily, when the supply passage 114 is pressurized with fluid, fluid flow will occur through the passage 116 into the chamber 124 for a relatively large expansion thereof by development of an actuating force on the force transmitting surface 130 in excess of the spring force of the spring 62. When desired, pressurized fluid may also be supplied to the pressure chamber 126 by means of the selectively controlled force control valve device 134, accompanying a relatively smaller expansion thereof between the volumes shown in FIGURES 5 and 6 respectively.

Referring now to FIGURES 8 and 11 in particular, it will be observed that a bore is formed in the valve body 32 for receiving a valve sleeve 136 of the force control valve 134. The force control valve also includes a rotatable valve element 138 rotatably mounted within the valve sleeve 136 and being provided with an axial passage 140 and continuously communicating with the pressure passage 114. The rotatable valve element 138 is provided with an outlet opening 142 communicating with the axial passage 140 therein so that when the rotatable valve element is disposed on a predetermined angular position, the outlet opening communicates with an outlet port 144 formed in the valve sleeve 136. The valve sleeve 136 is held in fixed position within the valve body 32 by means of a setscrew element 146 so that the outlet port thereof may communicate with the pressure supply passage 148 that provides fluid communication to the pressure chamber 126. The rotatable valve element 138 is therefore provided with a knurled portion 150 exposed at the bottom of the valve body 32 and being provided with an indicator element 152 so that the valve element 138 may be angularly positioned to provide fluid communication between the pressure passage 114 and the pressure chamber 126 such as shown in FIGURE 11 or block fluid communication completely. In this manner, the force transmitting surface 130 of the piston 38 may be exposed to fluid under pressure in chamber 124 producing an actuating force or both the force transmitting surfaces 130 and 132 may be exposed to fluid under pressure when applied to both chambers 124 and 126. Application of fluid under pressure to the pressure chambers as hereinbefore indicated, will be under the control of the fluid circuit interrupting valve device 98 actuated by the trigger member 28. It will therefore be apparent that upon supply of fluid under pressure to the piston 38, the rate with which the piston is displaced and the force capable of being transmitted by the piston will depend upon the setting of the force control valve 134 operative to control the pressure in chamber 126 by regulating fluid flow through passage 148. It should of course be appreciated that the pressure developed in chamber 126 may vary from a vacuum opposing the force actuating the piston 38, to a positive pressure augmenting the actuating force to thereby regulate the resultant actuating force imposed on piston 38.

In order to limit the loading of the piston 38 in accordance with the capacity of the pump mechanism of the fluid circuit with which the device is associated, a pressure relief or overload sensing valve device 154 is provided. The pressure relief valve 154 is exposed to the pressure within the pressure passage 114 by means of a restricted flow passage 156 which provides fluid communication between the pressure passage 114 and an internally threaded bore 158 formed in the valve body. An externally threaded plug 160 is received within the threaded bore 158 and seats a pressure spring 162 which reacts against the relief valve element 154 so as to adustably regulate the pressure at which the valve element 154 will open. It will therefore be apparent, that when the piston 38 is loaded at a predetermined value, the pressure developed within the pressure passage 114 will rise to a predetermined overload value sufficient to open the relief valve 154. When the relief valve 154 opens, a restricted flow of overload pressure fluid proceeds through the restricted passage 156 and pressurizes the chamber 160 disposed above the valve element 100 of the fluid circuit interrupting valve device 98. A bore 162 is therefore formed in the valve body 32 so as to provide fluid communication between the threaded bore 158 and the chamber 160, the bore 162 being closed by the plug 164 on the side of the valve device 98 opposite the intersecting internally threaded bore 158. As a result of the development of excessive pressure within the pressure passage 114 opening the relief valve 154 pressurization of the chamber 160 produces a downward force applied to the valve device 98 so as to force the valve device open against the operator's grip on the trigger 28 to instantaneously provide unrestricted fluid communication between the inlet and outlet conduits 24 and 26 through the passages 88, 92 and 110. This results in automatic and rapid unloading of the piston 38 and a rapid flow of fluid between the inlet and outlet conduits 24 and 26 through the passages 92, 88 and 110 so as to produce a venturi action therein. Suction pressure is therefore applied to the pressure passage 114 thereby assisting the return spring 62 in moving the piston 38 back to its initial position, it being apparent that the suction pressure in the passage 114 communicates with the chamber 124 of the piston. A more rapid release of the pruning blade of the device is thereby effected than would be possible by the release of trigger 28 after the operator realizes an overload condition exists and reacts thereto. Also, the valve body 32 is provided with a safety bleed valve 164 as more clearly seen in FIGURE 10 communicating with the passage bore 162 by means of an internally threaded bore 166 through a restricted passage 168. The passage may thereby be regulated in order to control the force with which the valve device 98 is returned to the open position as a result of overload of the piston developing the high overload pressure within the pressure passage 114 opening the relief valve 154 which then pressurizes the passage 162 with a restricted flow of fluid.

From the foregoing description, the operation and utility of the fluid power operated pruning shear will be apparent. With reference to the operational diagram of FIGURE 15, operation of the device may be reviewed. It will therefore be observed from FIGURE 15, that the pump mechanism 170 with which the power operated device may be associated, has a discharge connected to the inlet hose 24 which in turn is connected through the passages 92 and 110 and the open valve device 98 to the return hose 26 so as to complete a closed fluid circuit with the pump mechanism 170 being in an unloaded condition. The pressure developed within such a closed fluid circulating system will of course be relatively low as compared to the pressure necessary to develop a force within the pressure chamber 124 to overcome the force of the return spring 62. In order to operate the shears, the trigger actuator 28 is displaced upwardly so as to displace the valve device 98 against the bias of its spring thereby cutting off fluid communication between the inlet and outlet hoses 24 and 26 so as to interrupt the free circulating fluid pumping system. The pump discharge pressure therefore rapidly rises within the pressure passage 114 which is in fluid communication with the inner chamber 124 so as to develop a force sufficient to overcome the return spring 62 and thereby displace the piston 38. Should the force control valve 134 be closed, the rate at which the piston 38 is displaced will depend upon the volume of the expanding pressure chamber 124 which would be relatively rapid inasmuch as the volume thereof is relatively small. However, inasmuch as the force transmitting surface area 130 is relatively small, for a given pressure developed, a relatively small force will be produced. The pruning device may thereby be rendered operative for rapid action in connection with the pruning of small diameter stems or twigs. Should it however, be desired to utilize the pruning shear for cutting heavier limbs, the force control valve 134 may be open so that upon pressurization of the pressure passage 114 both the chambers 124 and 126 will be pressurized. Pressurization of both pressure chambers will cause a lower displacement rate of the piston in view of the larger volume involved but will also involve a greater force since the total force transmitting area of the piston will have been increased. Thus, the force control valve 134 is effective to condition the device for different load requirements. When the piston device has been loaded to a predetermined extent, the pressure within the pressure passage 114 will have risen to such a value as to open the relief valve 154 supplying a restricted flow of fluid through the restriction 156 to the passage 162 pressurizing the chamber 160 above the valve device 198. Accordingly, upon overload of the piston, a pressure surge develops to force the valve device 98 open thereby instantaneously unloading the pump 170 before its capacity is exceeded by the overloading of the piston load to which it has been connected by closing of the circulating flow between the inlet and outlet conduits 24 and 26. Also, as a result of the rapid fluid flow that occurs when the pump 170 is unloaded, suction pressure is developed within the pressure passage 114 and is applied to the pressure chamber 124 so as to assist the return spring 62 in rapidly returning the piston device 38 to its initial position to thereby rapidly release the pruning shear blades connected to the piston. Thus, the operational and constructional advantages of the fluid power operated tool of the present invention, will be apparent.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An actuating mechanism for a pruning shear or the like comprising, a multi-surface piston having a plurality of force transmitting surfaces, a cylinder reciprocably mounting said piston to define a plurality of separate pressure chambers to which said force transmitting surfaces are exposed and a valve body connected to said cylinder including force control valve means for selectively providing fluid communication to said pressure chambers to vary the displacement rate and force transmitted by the piston, circuit interrupting valve means operatively connected to said pressure chambers, and relief valve means operatively connecting said pressure chambers to the circuit interrupting valve means by restricted flow of fluid, unrestricted fluid inlet and outlet conduits connected to said circuit interrupting valve means and a trigger actuator mounted on said valve body for closing said circuit interrupting valve means.

2. The combination of claim 1 including passage means opened by said circuit interrupting valve means and operatively connected to said pressure chambers to produce a suction pressure therein in response to unrestricted flow of fluid between said inlet and outlet conduits.

3. The combination of claim 2 including a tubular extension rotatably connected to said cylinder, an actuating rod connected to said piston and slidably extending through said tubular extension, and adjustable linkage means operatively connecting said actuating rod to a tool adapted to be mounted on the tubular extension.

4. The combination of claim 1 including a tubular extension rotatably connected to said cylinder, an actuating rod connected to said piston and slidably extending through said tubular extension, and adjustable linkage means operatively connecting said actuating rod to a tool adapted to be mounted on the tubular extension.

5. A power unit adapted to operate a load engaging tool or the like comprising, circulating fluid means through which fluid normally flows, force developing means operatively connected to said circulating fluid means, selectively operable means operatively connected to said circulating fluid means for selective displacement to a position blocking said flow of fluid to develop pressure in said force developing means, and overload sensing means operatively connected to the selectively operable means for instantaneous displacement of the selectively operable means to a position unblocking said flow of fluid in response to development of an overload pressure in the force developing means.

6. A power unit adapted to operate a load engaging tool or the like comprising circulating fluid means through which fluid normally flows, force developing means operatively connected to said circulating fluid means, selectively operable means operatively connected to said circulating fluid means for selective displacement to a position blocking said flow of fluid to develop pressure in said force developing means, and overload sensing means operatively connected to the selectively operable means for displacement to a position blocking said flow of fluid in response to development of an overload pressure in the force developing means, said force developing means including at least two pressure sealed chambers operatively connected to said circulating fluid means, piston means movably mounted in said chambers for force applying movement by pressure developed therein when the fluid flow in the circulating fluid means is blocked, and means responsive to flow produced by unblocking of said circulating fluid means for rapidly decreasing the pressure developed in the chambers, said overload sensing means being operatively connected to one of said chambers for responding to any overload pressure developed therein.

7. The power unit defined in claim 6, including force varying means operatively connected to the force developing means and the circulating fluid means for varying the force developed when said flow of fluid is blocked.

8. A power unit adapted to operate a load engaging tool or the like comprising, circulating fluid means, force developing means, at least two passages, operatively connecting said circulating fluid means to the force developing means, selectively operable means operatively connected to said circulating fluid means for blocking flow of fluid therein to induce flow of fluid under pressure in said two passages, and force varying means operatively connected to one of said passages for controllably varying the rate of flow of fluid to the force developing means induced when said flow of fluid in the circulating fluid means is blocked.

9. The power unit defined in claim 8 wherein said force developing means includes at least two pressure sealed chambers respectively connected to said circulating fluid means by said two passages, piston means movably mounted in said chambers for force applying movement by pressure developed therein when the fluid flow in the circulating fluid means is blocked, and means responsive to flow produced in the other of said passages by unblocking of said circulating fluid means for rapidly decreasing the pressure developed in the chambers, said one of the passages being connected to the other of said chambers for selectively regulating the pressure developed therein.

10. A power unit adapted to operate a load engaging tool or the like comprising, circulating fluid means, force developing means, fluid passage means, operatively connecting said force developing means to the circulating fluid means for conducting flow in opposite directions, selectively operable means operatively connected to said circulating fluid means for blocking flow of fluid therein to induce flow of fluid under pressure in one direction through the passage means, means for unblocking flow in the circulating fluid means inducing flow in the other direction through the passage means to reduce the pressure developed in the force developing means and means responsive to flow produced in the passage means in the other direction for increasing the rate at which the pressure developed in the force developing means is reduced.

11. The power unit defined in claim 10 including, force varying means operatively connected to the passage means for varying the rate of flow induced therein when said flow of fluid is blocked.

12. In combination with a fluid circuit having a source of fluid under pressure, a fluid power device comprising, piston means having at least two surfaces exposed to fluid under pressure from said source, passage means connected to said fluid circuit and the piston means for supply and exhaust of fluid from the piston means, circuit interrupting valve means for loading the fluid circuit to induce flow of fluid in one direction through the passage means, means continuously biasing said valve means to a position unloading the fluid circuit, actuating means engageable with the valve means for displacement thereof to a position loading the fluid circuit, and pressure sensing means connected to the passage means and the valve means for augmenting the biasing means to abruptly displace the valve means to said position unloading the fluid circuit when one of the surfaces on the piston means is exposed to an overload pressure.

13. The combination of claim 12 including flow rate regulating means connected to said passage means for restrictively controlling variation in pressure to which the other of the surfaces in the piston means is exposed.

References Cited by the Examiner

UNITED STATES PATENTS

| | | | |
|---|---|---|---|
| 2,366,909 | 1/1945 | Johnson | 30—228 |
| 2,493,696 | 1/1950 | Potstada | 30—228 |
| 2,517,164 | 8/1950 | Arps | 91—265 |
| 2,814,872 | 12/1957 | Gurrans | 30—228 |
| 2,930,122 | 3/1960 | Ffundt | 30—228 |

FOREIGN PATENTS 657,672  9/1951  Great Britain.

SAMUEL LEVINE, *Primary Examiner.*

EDWARD V. BENHAM, FRED E. ENGELTHALER,
*Examiners.*